US006010059A

United States Patent [19]
Newland

[11] Patent Number: 6,010,059
[45] Date of Patent: Jan. 4, 2000

[54] METHOD FOR ULTRASONIC JOINING OF ELECTRICAL PARTS USING A BRAZING ALLOY

[75] Inventor: Charles A. Newland, DeGraff, Ohio

[73] Assignee: Siemens Energy & Automation, Inc., Alpharetta, Ga.

[21] Appl. No.: 08/941,334

[22] Filed: Sep. 30, 1997

[51] Int. Cl.[7] .............................. B23K 1/06; B23K 35/12

[52] U.S. Cl. ....................... 228/110.1; 228/245; 228/249; 228/254

[58] Field of Search ................................ 228/110.1, 245, 228/249, 254

[56] References Cited

U.S. PATENT DOCUMENTS

| | | | |
|---|---|---|---|
| 2,833,238 | 5/1958 | Jones et al. | 113/59 |
| 3,550,207 | 12/1970 | Strauss | 18/30 |
| 3,747,198 | 7/1973 | Benson et al. | 29/471.01 |
| 4,017,266 | 4/1977 | Goldberg et al. | 428/600 |
| 4,019,876 | 4/1977 | Stockel | 428/621 |
| 4,054,814 | 10/1977 | Fegley et al. | 315/71 |
| 4,119,260 | 10/1978 | Stockel et al. | 228/111 |
| 4,139,140 | 2/1979 | Stockel | 228/110 |
| 4,228,944 | 10/1980 | Inamura et al. | 228/198 |
| 4,247,036 | 1/1981 | Salesse et al. | 228/194 |
| 4,631,805 | 12/1986 | Olsen et al. | 29/588 |
| 4,736,070 | 4/1988 | Girard | 174/84 |
| 4,955,523 | 9/1990 | Calomagno et al. | 228/179 |
| 4,999,464 | 3/1991 | Bellino et al. | 200/267 |
| 5,189,507 | 2/1993 | Calomagno et al. | 257/777 |
| 5,193,732 | 3/1993 | Interrante et al. | 238/1.1 |
| 5,330,088 | 7/1994 | Whitlow et al. | 229/179.1 |
| 5,476,211 | 12/1995 | Khandros | 228/180.5 |
| 5,493,069 | 2/1996 | Conti | 174/94 |
| 5,567,981 | 10/1996 | Bhansali et al. | 257/643 |
| 5,598,629 | 2/1997 | Schneider et al. | 29/879 |
| 5,651,494 | 7/1997 | Ogino et al. | 228/110.1 |
| 5,785,786 | 7/1998 | Suzuki et al. | 156/73.1 |

OTHER PUBLICATIONS

Welding Handbook, Eighth Edition, American Welding Society; vol. 1, 1987, pp. 23–25 and 41–42; vol. 2, 1991, pp. 391–395; vol. 4, 1998, pp. 561–566.

*Primary Examiner*—Patrick Ryan
*Assistant Examiner*—Kiley Stoner

[57] ABSTRACT

A method of mechanically joining electrically conductive parts to form an electrically conductive joint by providing first and second electrically conductive parts that are to be joined to establish electric conductivity between them wherein the first part comprises non-alloying material and the second part comprises non-ferrous material. Brazing material is disposed between the parts at a location where they are to be joined. Ultrasonic energy is then applied. The brazing material is selected to comprise at least two materials, one of the two materials being elemental copper, and the elemental copper being the largest single constituent of the brazing material. The invention also provides a novel construction for parts that form a portion of an interruptable current path through a circuit protection device such as an electric circuit breaker.

10 Claims, 5 Drawing Sheets

METHOD FOR ULTRASONIC JOINING OF ELECTRICAL PARTS USING A BRAZING ALLOY

FIELD OF THE INVENTION

This invention relates generally to the ultrasonic joining of electrically conductive materials. More specifically, it relates to the realization that by selecting certain brazing materials, ultrasonic welding can be used to join two diverse electrically conductive materials, which it is believed, have been previously considered incompatible for joining by ultrasonic welding to create a joint that can withstand electric current faults, such as occur in circuit breakers.

BACKGROUND OF THE INVENTION

Electric circuit protection devices, such as circuit breakers, for example, may be used to interrupt current flow relatively quickly to a circuit that is being protected by the protection device upon the occurrence of an overload, such as a fault. This has been referred to in the industry as tripping the breaker. Once the condition that gave rise to the trip has been corrected, the circuit breaker may be reset, such as by appropriately manipulating an operating handle in the case of a manually resettable circuit breaker.

When a circuit breaker trips because of a dead short fault, it is believed that relatively large magnitudes of electric current may flow through the interruptable current path of a circuit breaker, so as to initiate the trip. However, the circuit breaker integrity must be maintained until it finally completes the trip. Moreover, because it is resettable, a circuit breaker must be capable of maintaining its integrity over its specified life, during which the circuit breaker may be subjected to multiple instances of tripping and resetting.

The internal construction of a circuit breaker comprises various individual electric parts. Some of these parts are joined together by welding or brazing. A known method for joining certain parts comprises high temperature welding. An example of high temperature welding is resistance welding wherein pressure is applied to the parts at a location where they are to be joined, and welding current is passed through the location to create temperatures sufficiently high to cause a certain degree of localized material melting and flow migration between the parts so that upon termination of the welding current, the molten mass solidifies to create the joint. It is believed that the thermal effects of resistance welding may act on the parts in a manner that undesirably affects one or more physical properties of at least one of the parts being joined. One example of such a side effect comprises some annealing of all or a portion of a part.

Another known method for joining certain parts comprises ultrasonic welding wherein pressure is applied to the parts at a location where they are to be joined, such as by clamping them in a suitable fixture in an ultrasonic welder. Ultrasonic energy is then applied to that location to create a certain upsetting and flow of material between the parts which ceases upon termination of the application of the ultrasonic energy, thereby creating the joint. It is believed that one advantage of ultrasonic welding is the elimination or at least attenuation of annealing of the parts being joined.

In any particular application, it is believed that the choice of using either resistance welding or ultrasonic welding depends on the composition of the parts being joined. For example, in a circuit breaker application where an electric contact is to be joined to another electric part, such as a terminal or a movable contact arm or blade, if the contact comprises the combination of a refractory element, such as tungsten or molybdenum, and an electric conductor, such as silver or copper, and the other part comprises, either predominantly or exclusively, a non-ferrous electric conductor, such as copper, the disposition of an attachment agent on a face of the contact that is to be placed in intimate surface-to-surface contact with the non-ferrous conductor is generally believed to be suitable for high-temperature welding. The attachment agent should be compatible with the contact's conductor material; for example, being fine silver when the contact conductor comprises silver. It is believed, however, that such materials are inappropriate or at least not optimally suited for ultrasonic welding. It is also believed that refractory-based materials are at least generally not optimal candidates for the alloying that is necessary to create an acceptable joint by ultrasonic welding.

SUMMARY OF THE INVENTION

The present inventions relating to a novel method and a brazing material selection that provide for materials that previously have been believed to be inappropriate for satisfactorily joining parts by ultrasonic welding.

Although the principles described herein are not necessarily limited to the joining of parts of an electric circuit protection device such as a circuit breaker, it is believed that these principles may provide significant advantages when used in a circuit breaker, especially one where one of the parts to be joined predominantly comprises a refractory material. It is believed that one advantage is that improved integrity, and hence useful life, of a circuit breaker is attainable, enabling a tripped breaker to be reset multiple times after having been subjected to relatively large magnitude fault currents that have caused multiple tripping events.

One aspect of the invention relates to a method of mechanically joining electrically conductive parts comprising, providing first and second electrically conductive parts that are to be joined to establish electric conductivity between them wherein a constituent of the first part comprises a non-alloying material and the second part comprises a predominance by weight of non-ferrous material, disposing brazing material between the parts at a location where they are to be joined, and joining the parts at that location by the application of ultrasonic energy, wherein the brazing material is selected to comprise at least two materials, one of the two materials being elemental copper, and the elemental copper being the largest single constituent of the brazing material by weight.

Another aspect of the invention relates to an electric circuit protection device comprising an interruptable current path for interrupting current flow to a load including trip means for tripping the interruptable current path upon occurrence of a load fault, the interruptable current path comprising first and second electrically conductive parts that have been joined by ultrasonic welding to establish electric conductivity between them, the first part comprising non-alloying material, the second part comprising non-ferrous material, and a brazing material that has been acted upon by the ultrasonic welding to join the parts, the brazing material being selected to comprise at least two materials, one of the two materials being elemental copper, and the elemental copper being the largest single constituent of the brazing material.

Still another aspect of the invention relates to an electric conductor assembly comprising an electrically conductive contact and an electrically conductive contact carrier joined together by ultrasonic welding to establish electric conductivity between them, one of the contact and the carrier comprising non-alloying material, the other of the contact and the carrier comprising non-ferrous material, and a brazing material that has been acted upon by the ultrasonic welding to join the contact and the carrier, the brazing material being selected to comprise at least two materials, one of the two materials being elemental copper, and the elemental copper being the largest single constituent of the brazing material.

More specific aspects related to the aforementioned general aspects comprise: the elemental copper of the brazing material being at least 50% by weight of the brazing material, more particularly being an alloy consisting of substantially 80 parts elemental copper by weight, substantially 15 parts elemental silver by weight, and substantially 5 parts elemental phosphorus by weight; the non-alloying material comprising a refractory material, more particularly the refractory material comprising at least 35% by weight of the contact, and more particularly being from the group consisting of silver tungsten, silver tungsten carbide, copper tungsten, copper tungsten carbide, and silver molybdenum; the non-ferrous material being copper; and the brazing material comprising silver as another elemental material, the contact being infiltrated with silver.

Products resulting from the claimed inventions also embody the inventive principles.

The foregoing, along with additional features, and other advantages and benefits of the inventions, will be seen in the following description and claims which are accompanied by drawings and disclose preferred embodiments of the inventions according to the best mode contemplated at this time for carrying out the inventions.

DESCRIPTION OF THE INVENTIONS

Figure 1:
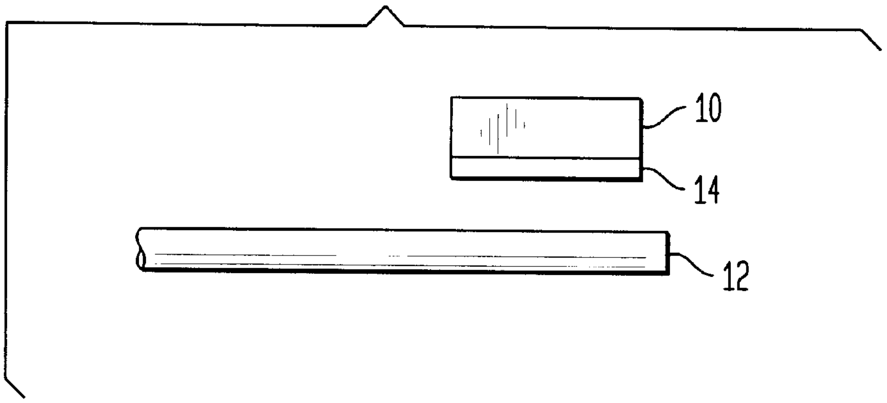
FIG. 1 is an elevation view, schematic in nature, illustrating a stage in the inventive method.
Figure 2:
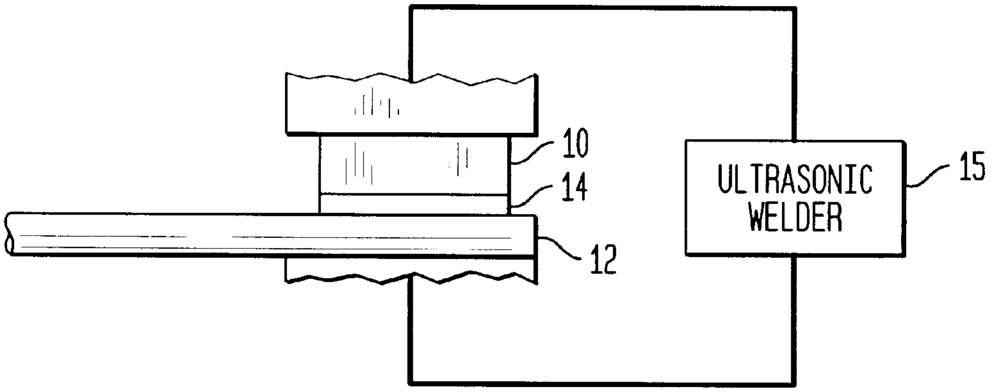
FIG. 2 is an elevation view, schematic in nature, illustrating a further stage in the inventive method.
Figure 3:
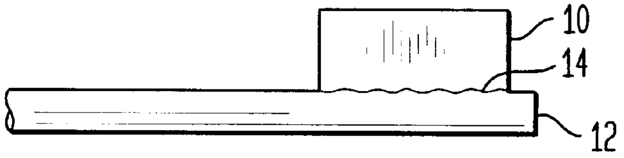
FIG. 3 is an elevation view, schematic in nature, of parts that have been joined by the inventive method.

One application of the inventions is presented by the following specific example of the joining of one part of a circuit protection device to another, the example showing the joining of a contact to a contact arm of a of a circuit fault that causes the breaker to trip. Moreover, it is believed that the joint has been created with little or essentially no degradation in the physical properties, such as hardness, of the joined materials. Moreover, the beneficial use of a refractory based contact has been advantageously retained.

While a specific composition for the brazing alloy has been given in the example just described, it is believed that satisfactory results may be obtained with somewhat different compositions. It is believed that one consideration for the brazing alloy is that it comprise at least two elemental materials and that the major constituent be an abundance of elemental copper over any other constituent material.

Ultrasonic welding machines for performing the joining that is the subject of the present invention are commercially available. They can be selected and set to meet specified performance criteria to accomplish part joining in accordance with relevant specifications, such as current carrying capacity, trip time, etc. Examples of suitable ultrasonic welders are: Sonobond Model No. MH-1545, available from Sonobond Ultrasonics Company, 200 East Rosedale Ave., Westchester, Pa. 19380; and ATE Ultraweld 20 System available from American Technology Equipment, Inc., 25 Controls Drive, Shelton, Conn. 06484.

FIGS. 4 to 8 illustrate a portion of a circuit breaker mechanism including an actual contact joined to a contact arm 12. Contact arm 12 forms a carrier for the contact by an illustrative two-piece construction, comprising a first contact arm piece 12A and a second contact arm piece 12B. Contact 10 is joined to the distal end of contact arm 12, creating a contact arm assembly 13. The two pieces 12A, 12B are essentially mirror images of each other. As shown for piece 12A by FIG. 6, confronting portions of each piece 12A, 12B proximate the distal end of contact arm 12 comprises respective zones 16 where they are joined directly together. Such joining may be accomplished by ultrasonic welding or brazing.

Proximate to zones 16, the joined pieces 12A, 12B form a bifurcation. Proximate the distal end of this bifurcation which is proximate zones 16, each piece 12A, 12B has an abutment 18 whose free end is adapted to abut, but at the minimum at least closely confront, the free end of the opposite abutment 18. At the proximate end of contact arm 12, each piece 12A, 12B has a lobe 20 that, in the completed circuit breaker, defines an axis 22 about which contact arm assembly 13 executes swinging motion.

Figure 4:
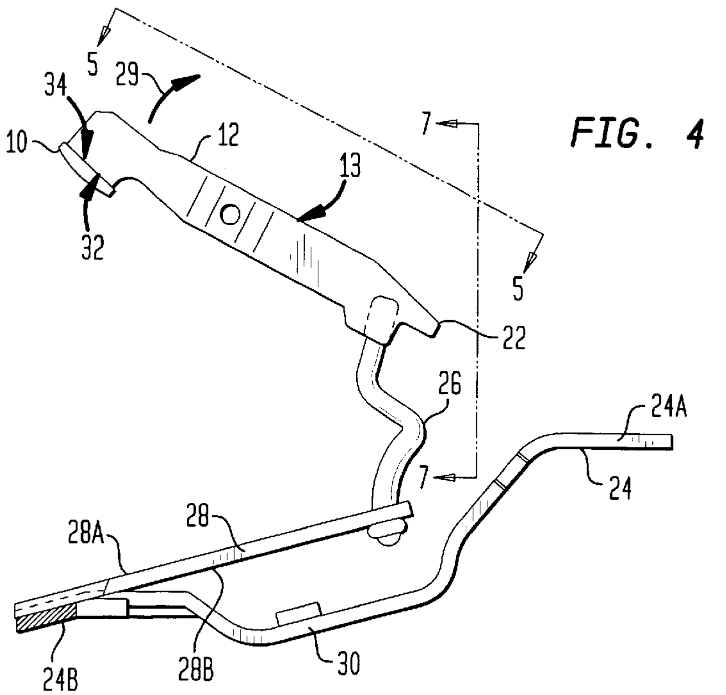
FIG. 4 is an elevation view of a portion of a circuit breaker mechanism containing a contact arm assembly that includes a refractory-based contact joined to a two-piece contact arm in accordance with the present invention.
Figure 5:
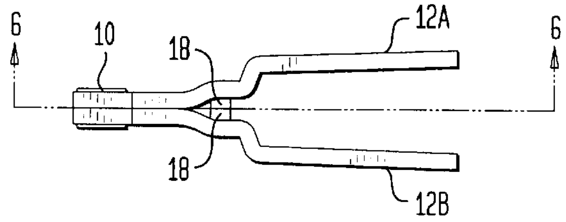
FIG. 5 is a view in the direction of arrows 5—5 in FIG. 4.
Figure 7:
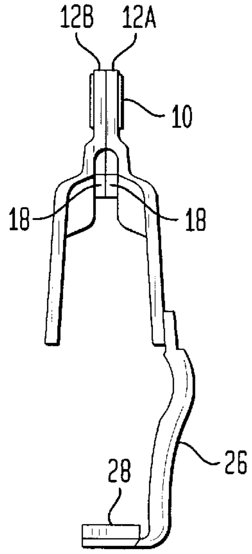
FIG. 7 is a view substantially in the direction of arrows 7—7 in FIG. 4.
Figure 8:
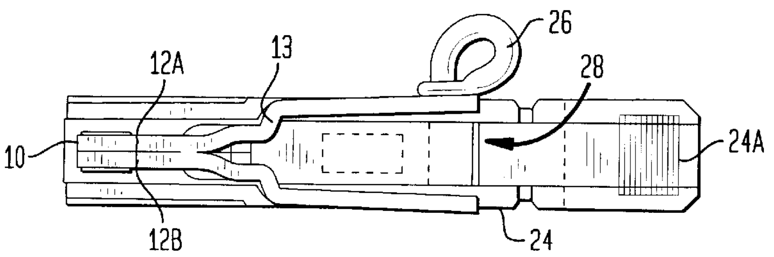
FIG. 8 is a top view of FIG. 4.

Further portions of the mechanism shown in FIGS. 4, 7 and 8 comprise a load terminal 24, a flexible connector, or braid 26 and a bi-metal 28. Load terminal 24 is adapted to be mounted on a casing (not shown) of a circuit breaker, for example by a fastener, such as a headed screw, whose shank is passed a hole in the casing and threaded into an extruded hole 30 in the load terminal. The end of terminal 24 designated 24A leads to a load circuit (not shown). The end designated 24B provides a cantilever mounting for bi-metal 28.

Bi-metal 28 comprises a nominally flat strip having a relatively higher expansion side 28A and a relatively lower expansion side 28B. The distal end of bi-metal 28 and one end of braid 26 are joined together, such as by brazing. The opposite end of braid 26 is joined, by brazing for example, to contact arm 12 distally proximal to a lobe 20 of one of the two pieces 12A, 12B, the one piece being 12A in the example depicted.

When a finished circuit breaker containing the mechanism just described is in its "on" position, contact 10 has direct contact with another contact that is connected to a line terminal (not shown). Hence a complete circuit exists from that line terminal and its associated contact, through contact 10, contact arm 12, braid 26, and bi-metal 28, to load terminal 24. One type of fault condition that should cause the circuit breaker to trip is due to thermal energy input to bi-metal 28 sufficient to warp the bi-metal to an extent that causes operation of a trip mechanism (not shown). As a result, contact arm assembly 13 swings in the sense of arrow 29 in FIG. 4 to separate contact from the line terminal contact that it had been engaging. This breaks the continuity through the circuit breaker between the line terminal and load terminal 24, causing the circuit breaker to operate to "tripped" condition.

Figure 6:
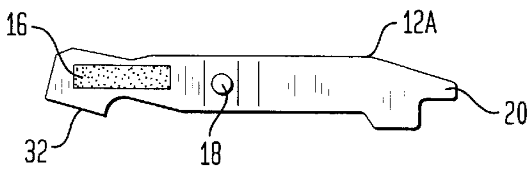
FIG. 6 is a view in the direction of arrows 6—6 in FIG. 5 of one of the two contact arm pieces by itself.

FIGS. 4 and 6 show adjoining flat rectangular surface areas 32 of contact arm pieces 12A and 12B. Contact 10 has a rectangular surface area 34 of slightly larger overall area than the combined surface areas 32. Joining of surface area 34 to the surface areas 32 is advantageously accomplished by the present approach. The occurrence of a fault that should trip the circuit breaker may create relatively large current densities through the joint between contact and contact arm 12. The present approach is believed to aid in better maintaining the integrity of the joint under such high stress conditions. This is important where small areas are involved. Although general principles of the invention are not intended to necessarily be limited to particular interface areas, it is believed that interface areas less than about ¼"×5⁄16" are especially well-suited for successful joining, at least in the case of joining a contact to a contact arm in an electric circuit protection device like a circuit breaker. "Interface area" is understood to include the area where the actual joining takes place. Specific examples of interface areas that have been used in practice of the inventive principles are 9⁄16"×5⁄32" and ⅛"×9⁄32". By gathering a contact in an ultrasonic welder, it is believed that the thickness of the contact may be any of a number of different thicknesses typically used for contacts. Examples of typical thicknesses may range up to about 3⁄16".

Figure 9:
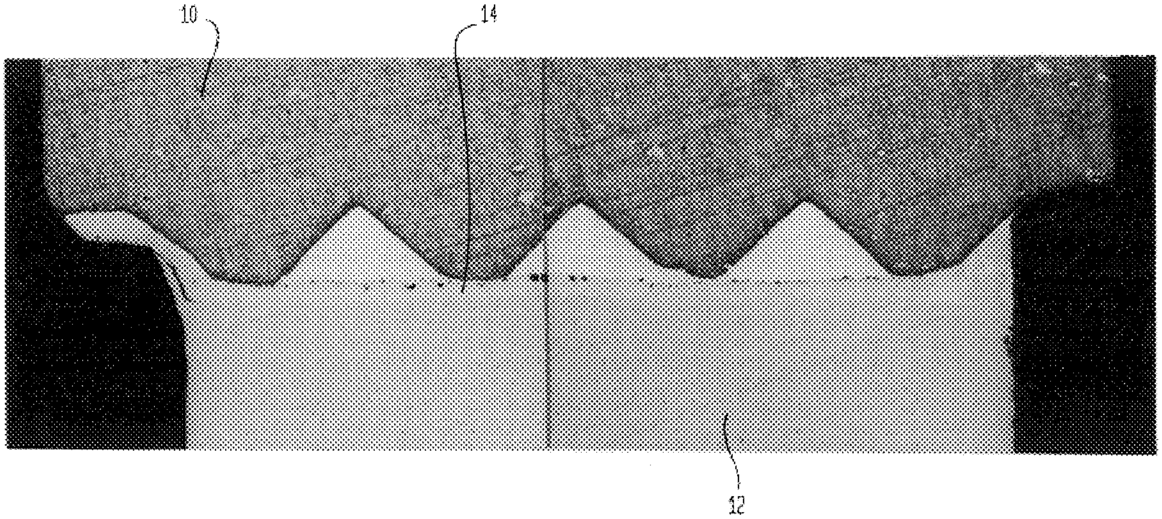
FIG. 9 is an enlarged photomicrograph of a cut-away cross section through an actual joint between a contact and a contact arm created in accordance with the present invention.
Figure 10:
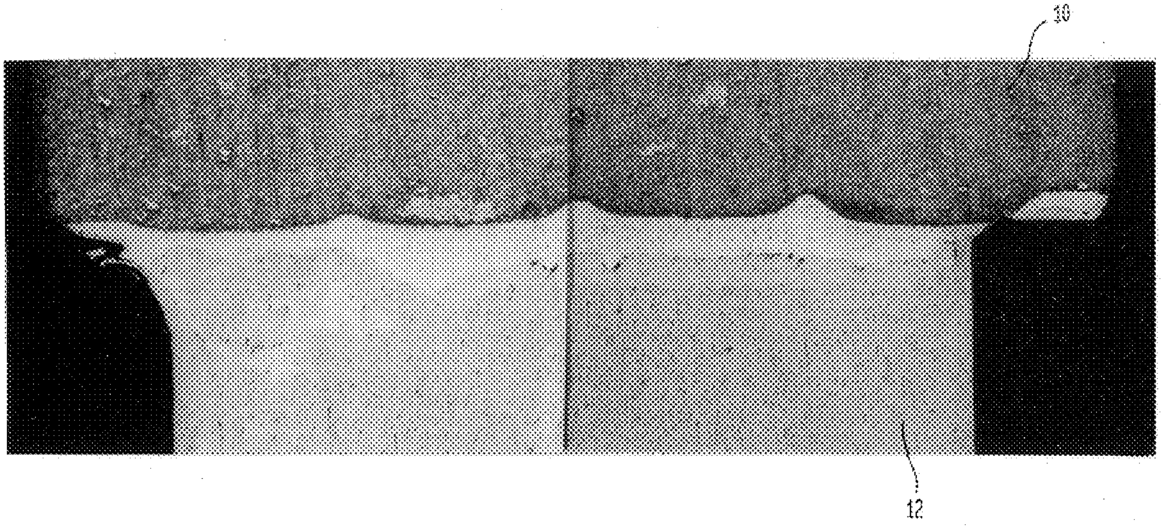
FIG. 10 is an enlarged photomicrograph of a cut-away cross section through another actual joint between another contact and another contact arm created in accordance with the present invention.
Figure 11:
FIG. 11 is an enlarged view, generally within the area 11 of FIG. 10, that has been enhanced in brightness and contrast to show a particular feature.

FIGS. 9 and 10 show two examples of actual joints reated by use of the joining procedure. The contact arm comprises predominantly copper, with small amounts of iron and silicon. An example is Cu at least about 97–99%, Si 1% or less, and Fe 2% or less. The brazing alloy consists of substantially 80 parts elemental copper by weight, substantially 15 parts elemental silver by weight, and substantially 5 parts elemental phosphorus by weight. The contact is 50% Ag and 50% WC by weight. The accompanying patent drawings of FIGS. 9 and 10 contain 50× photomicrographs. In each of FIGS. 9 and 10, it can be seen that brazing alloy 14 was joined to contact 10 before the ultrasonic welding of the contact to contact arm 12. Excess silver fills troughs of serrations in the contact. The brazing alloy appears as a layer overlapping the serrations, and the region of ultrasonic bonding is so labeled. It is believed that there is essentially complete bonding across the joint. FIG. 10 shows evidence of "swirling" at the interface, which is believed to indicate relatively good quality. FIG. 11 is believed to show the swirling in more detail.

It is contemplated that the inventions are suitable for joining an electric conductor that is primarily copper to the following refractory-based materials: Silver-Tungsten; Silver Tungsten Carbide; Copper Tungsten; Copper Tungsten Carbide; and Silver Molybdenum. Of course, the relative percentages of the contact constituents may vary. Specific examples are given by the following table wherein hardness, density, and electrical conductivity data are representative. In the table, IACS refers to International Annealed Copper Standard.

| Class | Composition % by weight | Hardness (Rockwell) | Density am/cc | Conductivity % IACS |
|---|---|---|---|---|
| Silver Tungsten | 50Ag50W | B65 | 13.2 | 62 |
| | 40Ag60W | B75 | 14.0 | 55 |
| | 35Ag65W | B85 | 14.5 | 51 |
| | 25Ag7SW | B90 | 15.5 | 45 |
| | 45Ag50W5C | B50 | 10.6 | 40 |
| Silver Tungsten carbide | 65Ag35WC | B55 | 11.5 | 55 |
| | 60Ag40WC | B65 | 11.7 | 50 |
| | 50Ag50WC | B80 | 12.2 | 47 |
| | 40Ag60WC | B95 | 12.7 | 43 |
| | 35Ag65WC | B100 | 12.9 | 34 |
| Copper Tungsten | 50Cu50W | B65 | 11.9 | 50 |
| | 40Cu60W | B80 | 12.8 | 47 |
| | 30Cu70W | B90 | 13.9 | 46 |
| | 25Cu75W | B95 | 14.5 | 44 |
| | 20Cu80W | B100 | 15.2 | 40 |
| Copper Tungsten Carbide | 50Cu50WC | B95 | 11.0 | 45 |
| Silver Molybdenum | 50Ag50MO | B75 | 10.1 | 52 |
| | 45Ag55MO | B80 | 10.1 | 48 |
| | 40Ag60MO | B85 | 10.1 | 45 |
| | 35Ag65MO | B87 | 10.0 | 42 |
| | 30Ag70MO | B90 | 10.0 | 39 |

While the present inventions have been described with reference to the embodiments as currently contemplated, it should be understood that the invention is not intended to be limited to the described and preferred embodiments. Accordingly, the claimed inventions are intended to encompass various modifications and arrangements that are within the scope of the claims.

What is claimed is:

1. A method of mechanically joining electrically conductive parts comprising:

providing first and second electrically conductive parts that are to be joined to establish electric conductivity between them wherein a constituent of the first part comprises non-alloying material and the second part comprises a predominance by weight of non-ferrous material;

disposing brazing material between the parts at a location where they are to be joined, and joining the parts at that location by the application of ultrasonic energy, wherein the brazing material is selected to comprise at least two materials, one of the two materials being elemental copper, and the elemental copper being the largest single constituent of the brazing material by weight.

2. A method as set forth in claim 1 wherein the elemental copper of the brazing material is selected to be at least about 50% by weight of the brazing material.

3. A method as set forth in claim 2 wherein the brazing material is selected to be an alloy consisting of substantially 80 parts elemental copper by weight, substantially 15 parts elemental silver by weight, and substantially 5 parts elemental phosphorus by weight.

4. A method as set forth in claim 1 wherein the first part is selected to comprise a refractory material as the non-alloying material.

5. A method as set forth in claim 4 wherein the refractory material is selected to comprise at least about 35% by weight of the first part.

6. A method as set forth in claim 4 wherein the refractory material is selected from the group consisting of silver tungsten, silver tungsten carbide, copper tungsten, copper tungsten carbide, and silver molybdenum.

7. A method as set forth in claim 1 wherein the second part is selected to comprise copper as the non-ferrous material.

8. A method as set forth in claim 1 wherein the first part is selected to comprise a refractory material as the non-alloying material, and the second part is selected to comprise copper as the non-ferrous material.

9. A method as set forth in claim 1 wherein the brazing material is joined to the first part before being disposed between the first and second parts.

10. A method as set forth in claim 9 wherein the brazing material is selected to comprise silver as another elemental material, and the first part is infiltrated with silver to facilitate flow of material between the parts during joining.

* * * * *